(12) United States Patent
Lakshminarayan et al.

(10) Patent No.: US 9,037,518 B2
(45) Date of Patent: May 19, 2015

(54) CLASSIFYING UNCLASSIFIED SAMPLES

(75) Inventors: Choudur Lakshminarayan, Austin, TX (US); Evan Kriminger, Gainesville, FL (US); Jose C. Principe, Gainesville, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 13/562,058

(22) Filed: Jul. 30, 2012

(65) Prior Publication Data
US 2014/0032450 A1    Jan. 30, 2014

(51) Int. Cl.
*G06N 99/00* (2010.01)

(52) U.S. Cl.
CPC ................................... *G06N 99/005* (2013.01)

(58) Field of Classification Search
CPC .................................................... G06N 99/005
See application file for complete search history.

(56) References Cited

U.S. PATENT DOCUMENTS

| | | | |
|---|---|---|---|
| 7,428,550 | B2 | 9/2008 | Lakshminarayan et al. |
| 8,027,897 | B2 | 9/2011 | Lakshminarayan et al. |
| 8,180,693 | B2 | 5/2012 | Lakshminarayan et al. |
| 8,180,694 | B2 | 5/2012 | Lakshminarayan et al. |
| 2005/0114382 | A1 | 5/2005 | Lakshminarayan et al. |
| 2006/0047683 | A1 | 3/2006 | Lakshminarayan et al. |
| 2007/0198321 | A1 | 8/2007 | Lakshminarayan et al. |
| 2009/0300765 | A1 | 12/2009 | Moskovitch et al. |
| 2010/0063948 | A1 | 3/2010 | Virkar et al. |
| 2011/0307228 | A1 | 12/2011 | Kasabov |
| 2012/0084287 | A1 | 4/2012 | Lakshminarayan et al. |
| 2012/0095989 | A1 | 4/2012 | Lakshminarayan et al. |

OTHER PUBLICATIONS

Tutorial: Pearson's Chi-square Test for Independence, published 2008, http://www.ling.upenn.edu/~clight/chisquared.htm.*
A Distribution-Based Clustering Algorithm for Mining in Large Spatial Databases, by Xu, published 1998.*
Exploring Early Classification Strategies of Streaming Data with Delayed Attributes, by Giraldo, published 2009.*
The V*Diagram: A Query Dependent Approach to Moving KNN Queries, by Nutanong, published 2009.*
The weighted nearest neighbor rule for class dependent sample sizes, by Brown, published 1979.*

(Continued)

*Primary Examiner* — Jeffrey A Gaffin
*Assistant Examiner* — Thomas Fink
(74) *Attorney, Agent, or Firm* — International IP Law Group, PLLC

(57) ABSTRACT

A system and method for classifying unclassified samples. The method includes detecting a number of classes including training samples in training data sets. The method includes, for each class, determining a vector for each training sample based on a specified number of nearest neighbor distances between the training sample and neighbor training samples, and determining a class distribution based on the vectors. The method also includes detecting an unclassified sample in a data set and, for each class, determining a vector for the unclassified sample based on the specified number of nearest neighbor distances between the unclassified sample and nearest neighbor training samples within the class, and determining a probability that the unclassified sample is a member of the class based on the vector and the class distribution. The method further includes classifying the unclassified sample based on the probabilities.

20 Claims, 8 Drawing Sheets

(56) References Cited

OTHER PUBLICATIONS

Akbani, Rehan, et al., "Applying Support Vector Machines to Imbalanced Datasets," Machine Learning: ECML 2004, pp. 39-50.

Chawla, Nitesh V., et al., "Editorial: Special Issue on Learning from Imbalanced Data Sets," ACM SIGKDD Explorations Newsletter, vol. 6, No. 1, 2004, pp. 1-6.

Chawla, Nitesh V., et al., "SMOTE: Synthetic Minority Over-sampling Technique," Journal of Artificial Intelligence Research, vol. 16, No. 1, 2002, pp. 321-357.

He, Haibo, et al., "Learning from Imbalanced Data," IEEE Transactions on Knowledge and Data Engineering, 2008, pp. 1263-1284.

Kubat, Miroslav, et al., "Addressing the Curse of Imbalanced Training Sets: One-Sided Selection," Machine Learning—Int. Workshop then Conf., Citeseer, 1997, pp. 179-186.

Songbo Tan, "Neighbor-weighted K-nearest Neighbor for Unbalanced Text Corpus", Expert Systems with Applications 28, 2005, pp. 667-671.

Veropoulos, K., et al., "Controlling the Sensitivity of Support Vector Machines," Proceedings of the International Joint Conference on Artificial Intelligence, Citeseer, 1999, 6 pages.

Yuxuan Li, et al, "Improving K Nearest Neighbor with Exemplar Generalization for Imbalanced Classification", Proceedings of the 15th Pacific-Asia Conference on Advances in Knowledge Discovery and Data Mining, 2011, vol. Part II, pp. 321-332.

\* cited by examiner

300

CLASSIFYING UNCLASSIFIED SAMPLES

BACKGROUND

The performance of traditional classification methods is prone to deterioration when presented with significant class imbalance. Class imbalance occurs when the instances of one class are fewer in number than the instances of another class. More specifically, the term "class imbalance" refers to a relative imbalance between two classes, i.e., a minority class and a majority class, with class instance ratios on the order of 100 to 1, 1000 to 1, or higher.

The class imbalance issue has attracted considerable attention in recent years due to the inherent presence of class imbalances in many applications, including, for example, fraud detection applications, anomaly detection applications, and medical diagnosis applications. In addition, class imbalances may arise in any application in which the class distribution is not explicitly controlled during data collection. In many cases, class imbalances result in difficulty in detecting the minority class. For instance, in a medical test, there are typically significantly more negative instances than positive instances. Due to the scarcity of the positive class, a classifier that favors the negative class will produce an overall low error rate. However, false negatives are potentially catastrophic, while false positives simply warrant more testing. Thus, it is clear that providing fair classification with respect to minority classes is important.

Many methods designed to handle class imbalance fall into one of two categories, sampling methods and cost-sensitive methods. Sampling methods operate on the data itself, attempting to reduce the imbalance between classes by oversampling the minority class and/or under-sampling the majority class. Cost-sensitive methods apply more weight to errors made on the minority class, and may be applied to the data or incorporated into the classification algorithms themselves. Both sampling and cost-sensitive methods are tuned, either through the amount of sampling or through the relative costs assigned to each class, to provide the desired balance between classes. However, the user must provide this tuning. In many applications, the degree of imbalance will change, particularly when classifying online streaming data. However, since the algorithm is tuned to the degree of imbalance present in the training data set, such changes in the degree of imbalance must be accounted for via user intervention, which may become costly and time-consuming for the user.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to accounting for class imbalance in a data set by analyzing the structure of the data set itself. More specifically, techniques described herein relate to classifying one or more unclassified samples in a data set. Such techniques may adjust to any level of class imbalance in a data set, and may be used to account for the disadvantage that the minority class faces in classification. In addition, the techniques described herein may not rely on tuning parameters, such as user-defined thresholds.

Figure 1:
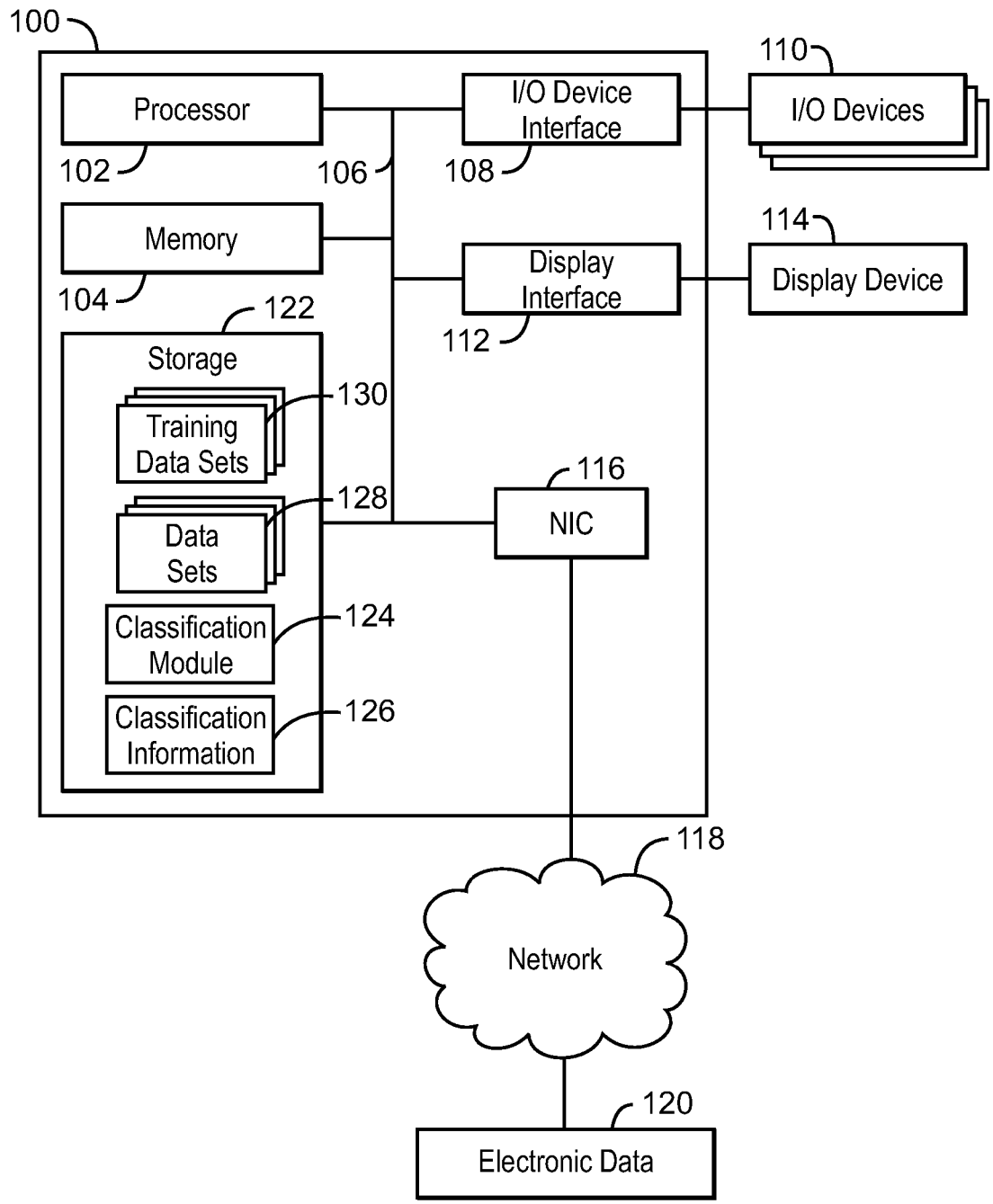
FIG. 1 is a block diagram of a computing device that may be used in accordance with examples.

FIG. 1 is a block diagram of a computing device 100 that may be used in accordance with examples. The computing device 100 may be any type of computing device that is capable of implementing the classification procedure described herein, such as a laptop computer, desktop computer, tablet computer, mobile phone, server, or the like. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to implement a method that includes classifying unclassified samples in a data set.

The processor 102 may be connected through a bus 106 to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. Furthermore, the I/O devices 110 may be built-in components of the computing device 100, or may be devices that are externally connected to the computing device 100.

The processor 102 may also be linked through the bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

A network interface controller (NIC) 116 may be adapted to connect the computing device 100 through the bus 106 to a network 118. The network 118 may be a wide area network (WAN), local area network (LAN), or the Internet, among others. Through the network 118, the computing device 100 may access electronic data 120. The computing device 100 may also download the electronic data 120 and store the electronic data 120 within a storage device 122 of the computing device 100.

The storage device 122 can include a hard drive, an optical drive, a thumbdrive, an array of drives, or any combinations thereof. The storage device 122 may include a classification module 124 that is adapted to generate classification information 126 for unclassified samples in one or more data sets 128 using training samples in one or more training data sets 130. The classification information 126 may include, for example, information relating to a class of each unclassified sample in a data set 128. In addition, the classification module 124 may prevent class imbalance for the unclassified samples in the data set 128 by ensuring that one or more minority classes are appropriately represented. The classification module 124 may be any type of program or application that is capable of providing such functionalities. The one or more data sets 128, the one or more training data sets 130, and the generated classification information 126 may be stored within the storage device 122 of the computing device 100.

It is to be understood that the block diagram of FIG. 1 is not intended to indicate that the computing device 100 is to include all of the components shown in FIG. 1. Further, the computing device 100 may include any number of additional components not shown in FIG. 1, depending on the details of the specific implementation.

The techniques described herein may be used to account for the disadvantage that the minority class faces in classification by pushing the classification boundary further from the minority class. Such a classification boundary may be extracted directly from the data, and may maintain high sensitivity to the positive class. The classification boundary may be based on the variability that is to be expected within each class, which may be represented by the nearest neighbor distances for samples within each class. The nearest neighbor distances for samples may be used to infer information about the class represented by the samples. For example, if the nearest neighbor distances for the samples are large, the associated class is likely to have a small number of representative samples. Therefore, the location of the class boundary may represent the relative distance properties of each class.

The nearest neighbor distances may not be computed by comparing the distance of a sample from each class directly. Rather, the nearest neighbor distances may be considered relative to the nearest neighbor distances for each class that is present among training samples within a given training data set. This approach may provide a measure of the likelihood that a new sample with certain nearest neighbor distances is a member of a particular class, given the distribution of the nearest neighbor distances for that class.

According to techniques described herein, a training data set of a given class may include a number of samples, denoted by C. The number of nearest neighbors that is to be computed, denoted by k, may be determined. For each sample, i∈[1 . . . C], the k nearest neighbors may be identified among the other C−1 samples, and the k nearest neighbor distances may be stored in a vector $d_i$. The nearest neighbors for a particular sample may be the neighboring samples that are in closest proximity to the sample in terms of Euclidean distance.

An unclassified testing sample in a data set may be detected. The k nearest neighbors to the unclassified testing sample within the C training samples may be determined, and the k nearest neighbor distances may be stored in a vector $d_{test}$. A set S may be defined as shown below in Eq. 1.

$$S := \{d_i | d_i > d_{test}\} \quad (1)$$

According to Eq. 1, operator ">" applies elementwise such that, for the vector $d_i$ to be included in the set S, all elements of the vector are to satisfy the condition. The probability p that an unclassified sample with the k nearest neighbor distances may be obtained from the training data set is evaluated. Such a probability p may be approximated by the fraction of the $d_i$ vectors that are elementwise greater than $d_{test}$. The probability p may be defined as shown below in Eq. 2.

$$p = \frac{\sum_{i=1}^{C} 1_S(d_i)}{C} \quad (2)$$

According to Eq. 2, $1_S(\bullet)$ is the indicator function of set S. The probability p is a measure of the distance of the unclassified sample from the class, relative to the distances that have been observed in the training data set. As described above, the probability p is calculated by determining the number of training vectors $d_i$ that have an element greater than $d_{test}$, and dividing by the total number of training samples, C. In addition, if the amount of samples in the training data set increases, new vectors $d_i$ may be added.

The techniques described above may be repeated for any number of classes, and a probability p value for an unclassified sample may be generated with respect to each class. For example, if there are N classes, the above steps may be repeated N times to generate a probability p value for each class. The unclassified sample may then be classified based on the probability p values. Specifically, the unclassified sample may be assumed to be a member of the class with the highest corresponding probability p value, which may be determined according to Eq. 3.

$$\operatorname{argmax}_{n \in [1 \ldots N]} \{p_n\} \quad (3)$$

In this manner, any number of unclassified samples may be classified based on the class distributions determined using the training samples. An exemplary implementation of these techniques is described below with respect to FIGS. 2 and 3.

Figure 2A:
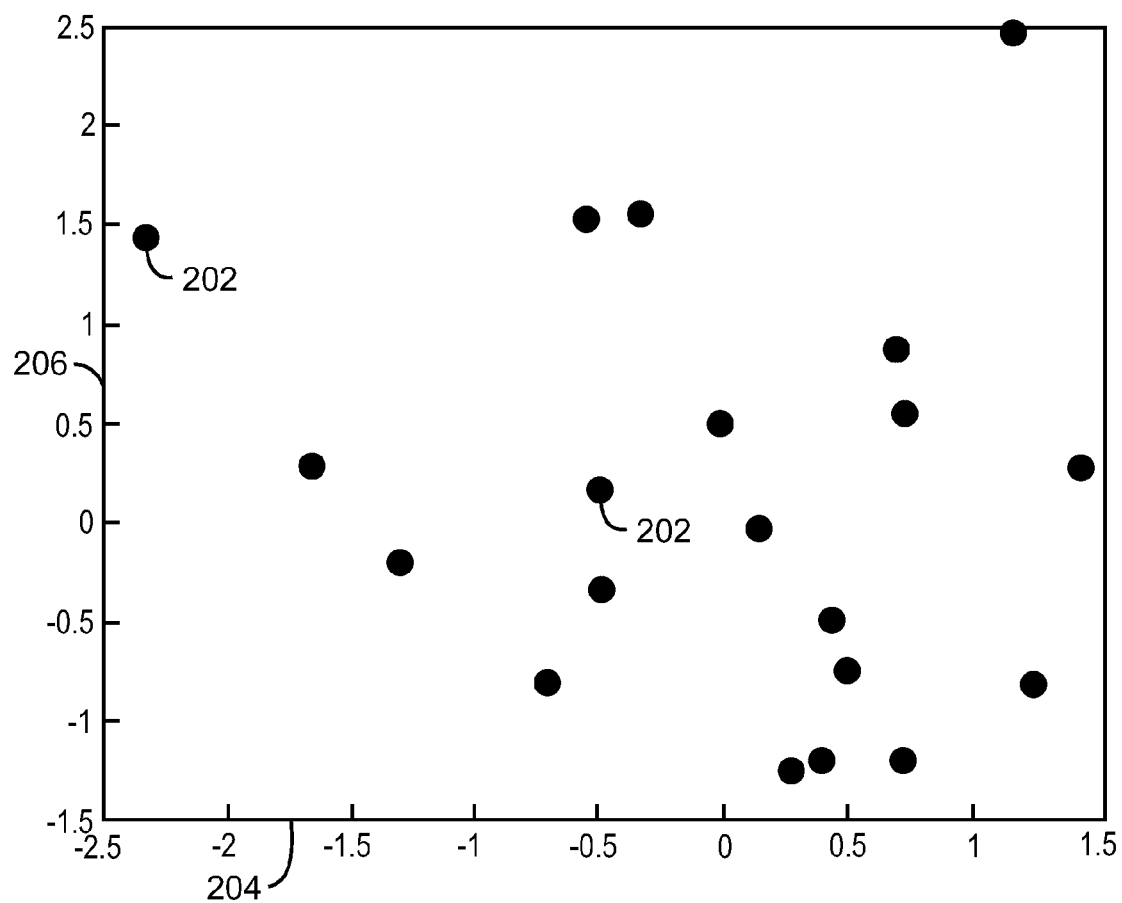
FIG. 2A is a plot showing training samples for a given class.

FIG. 2A is a plot 200 showing training samples 202 for a given class. In the plot 200, the x-axis 204 represents distances between the training samples 202 in the x-direction, and the y-axis 206 represents distances between the training samples 202 in the y-direction. The distances between the training samples 202 in the x-direction the y-direction may be used to determine a number of vectors relating to the training samples 202, as discussed further below. The training samples 202 may be included within a training data set. A specified number of nearest neighbors may be determined for each training sample 202, and nearest neighbor distances 208 may be computed for each sample, as shown in FIG. 2B.

Figure 2B:
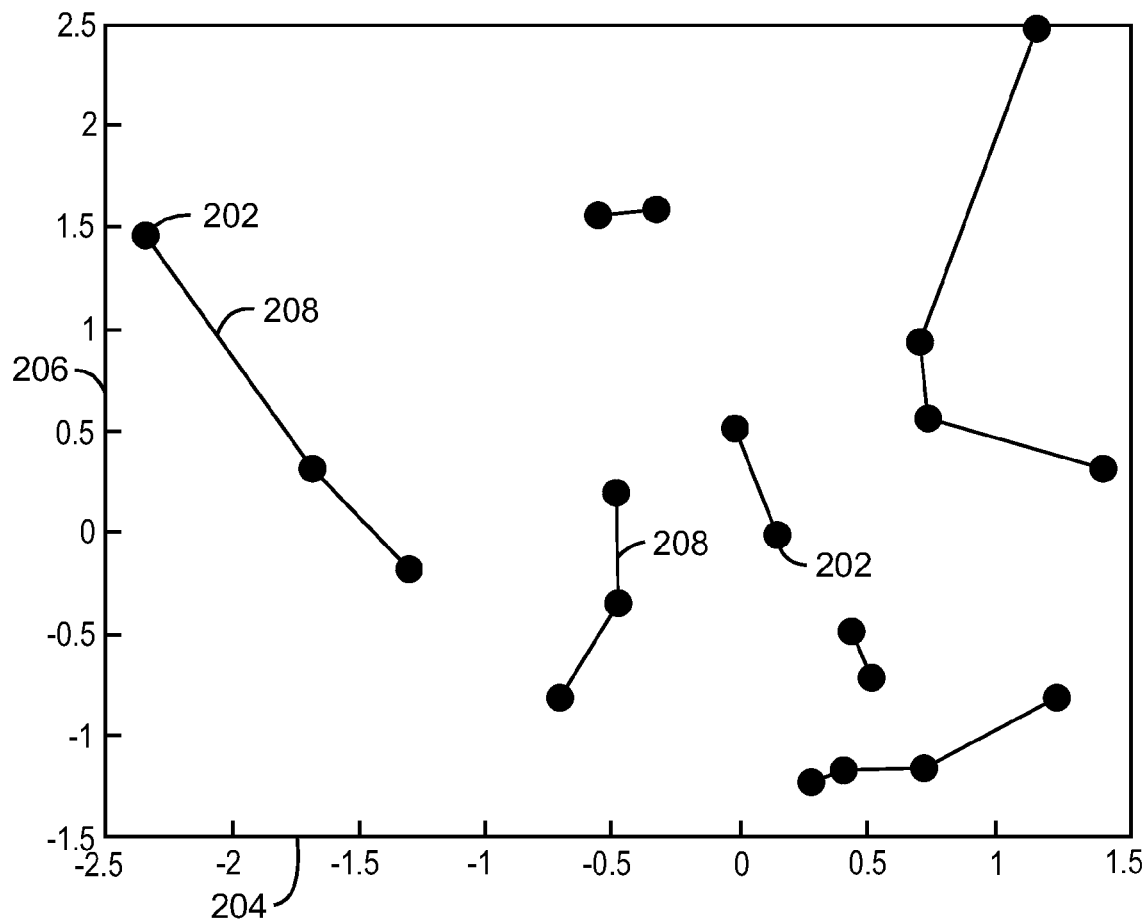
FIG. 2B is a plot showing the nearest neighbor distances between the training samples for the class.

FIG. 2B is a plot 210 showing the nearest neighbor distances 208 between the training samples 202 for the class. In the plot 210, the x-axis 204 represents the distances between the training samples 202 in the x-direction, and the y-axis 206 represents the distances between the training samples 202 in the y-direction. According to the example shown in FIG. 2, only one nearest neighbor training sample may be determined for each training sample. In other words, the parameter k may be set to 1. The nearest neighbor distances 208 may be used to generate a training vector for each training sample. The training vectors may be used to generate a class distribution 212 for the class, as shown in FIG. 2C.

Figure 2C:
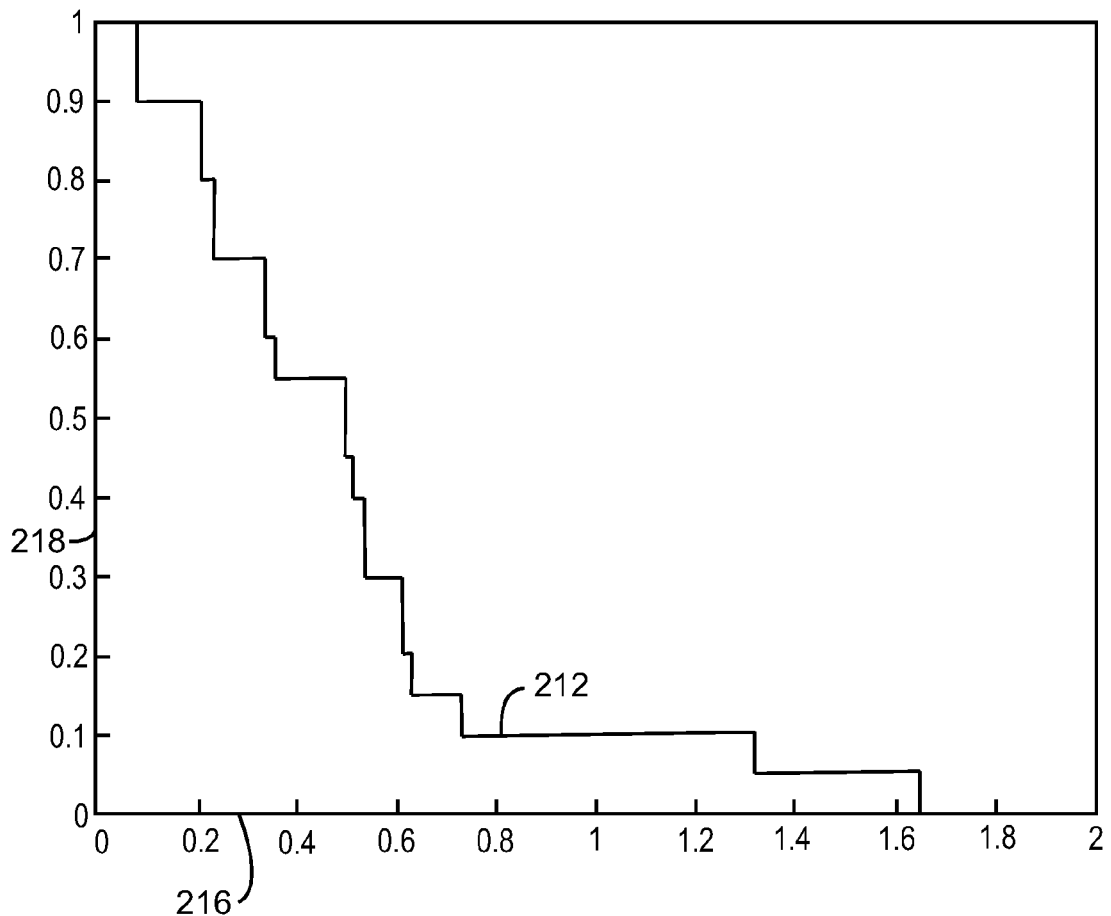
FIG. 2C is a plot showing the class distribution for the class.

FIG. 2C is a plot 214 showing the class distribution 212 for the class. In the plot 214, the x-axis 216 represents the constant, and the y-axis 218 represents the probability that the nearest neighbor distance of the class is greater than the constant. The class distribution function, denoted by $F_D(d)$, may be an empirical cumulative distribution function (CDF) for random variable D that represents the nearest neighbor distances for the given class. The probability that the nearest neighbor distance D of that class is greater than the constant, d, may be calculated according to Eq. 4.

$$P(D>d) = 1 - F_D(d) \quad (4)$$

The techniques described above with respect to FIG. 2 may be repeated for any number of classes. For example, according to the implementation described below with respect to FIG. 3, such techniques are used to find class distributions for a first class, e.g., the class described with respect to FIG. 2, and a second class.

Figure 3A:
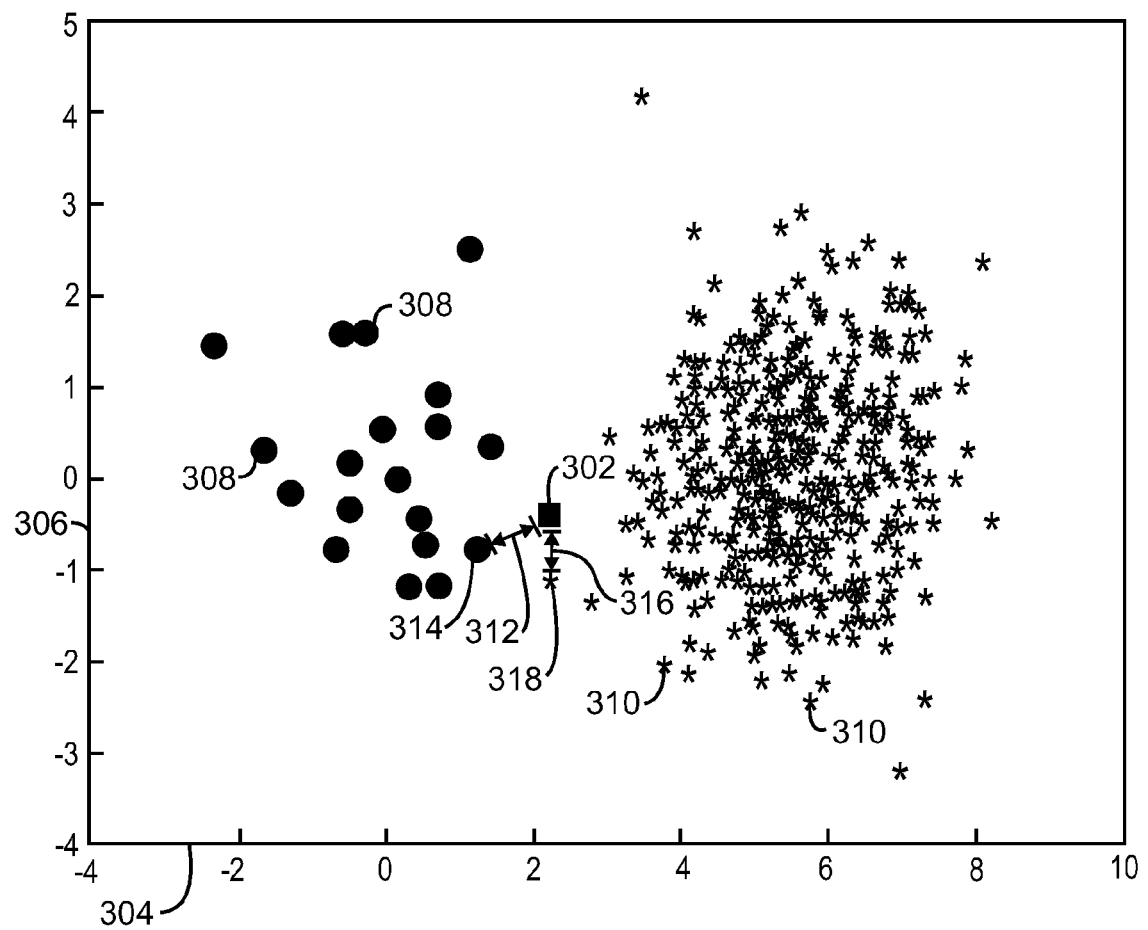
FIG. 3A is a plot showing training samples for two classes, as well as an unclassified sample.

FIG. 3A is a plot 300 showing training samples for two classes, as well as an unclassified sample 302. In the plot 300, the x-axis 304 represents distances between the training samples of each class and the unclassified sample 302 in the x-direction, and the y-axis 306 represents distances between the training samples of each class and the unclassified sample 302 in the y-direction. The distances between the training samples 302 and the unclassified sample 302 in the x-direction the y-direction may be used to determine a number of vectors relating to the training samples and the unclassified sample 302, as discussed further below.

The plot 300 shows first training samples 308 of the first class, second training samples 310 of the second class, and the unclassified sample 302. The unclassified sample 302 may be a testing sample obtained from a testing data set. A specified number of nearest neighbor training samples within each class may be determined for the unclassified sample 302. According to the example shown in FIG. 3, one nearest neighbor training sample within each class may be determined for the unclassified sample 302. Namely, a first nearest neighbor distance, $d_1$, 312 between the unclassified sample 302 and a first nearest neighbor training sample 314 within the first class may be determined, and a second nearest neighbor distance, $d_2$, 316 between the unclassified sample 302 and a second nearest neighbor training sample 318 within the second class may be determined.

Figure 3B:
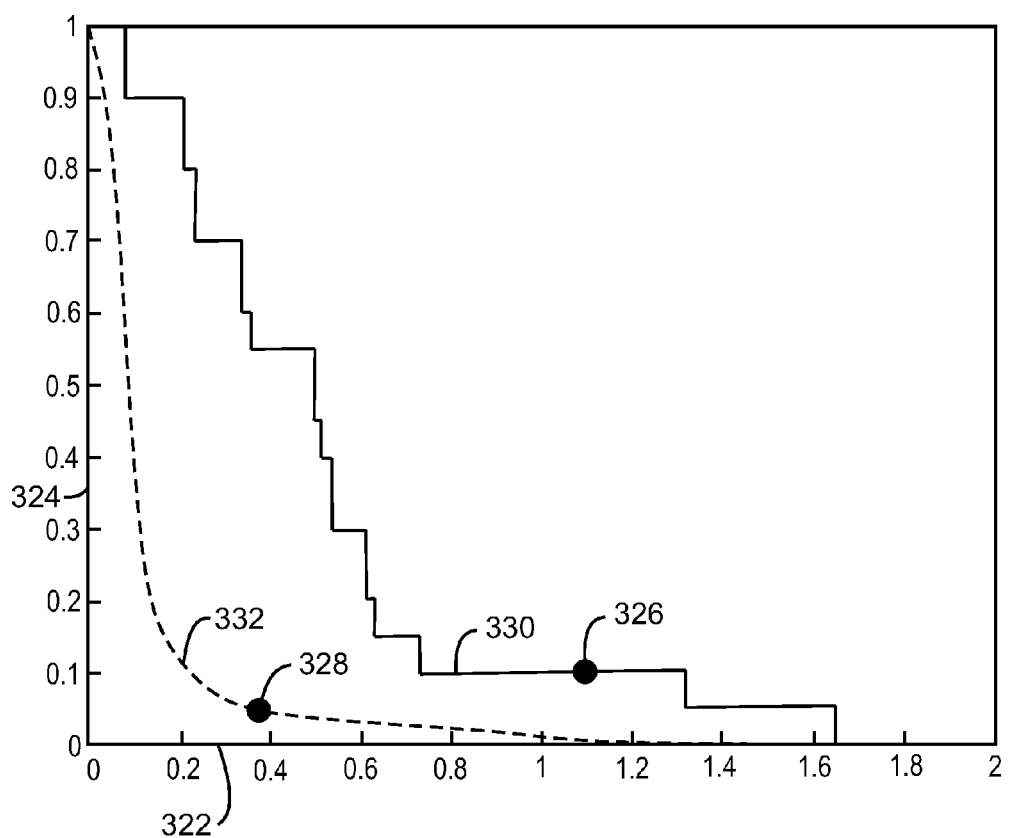
FIG. 3B is a plot showing probability values for the unclassified sample.

FIG. 3B is a plot 320 showing probability values for the unclassified sample 302. In the plot 320, the x-axis 322 represents a constant, and the y-axis 324 represents the probability that the nearest neighbor distance of each class is greater than the constant. The probability values may include a first probability 326 that the unclassified sample 302 is a member of the first class and a second probability 328 that the unclassified sample 302 is a member of the second class. The first probability 326 and the second probability 328 may be determined with respect to a first class distribution 330 of the first class and a second class distribution 332 of the second class, respectively. The first probability 326 and the second probability 328 may be denoted by $P_1(D>d_1)$ and $P_2(D>d_2)$, respectively. The first probability 326 and the second probability 328 may be used to determine a class for the unclassified sample 302, as shown below in Eq. 5.

$$\text{argmax}_{i \in \{1,2\}} \{P_i(D>d_i)\} \quad (3)$$

According to Eq. 5, the unclassified sample 302 is assigned to the class with the highest associated probability. Thus, the unclassified sample 302 may be assigned to the first class, since the first probability 326 is greater than the second probability 328, as shown in FIG. 3B.

Figure 4:
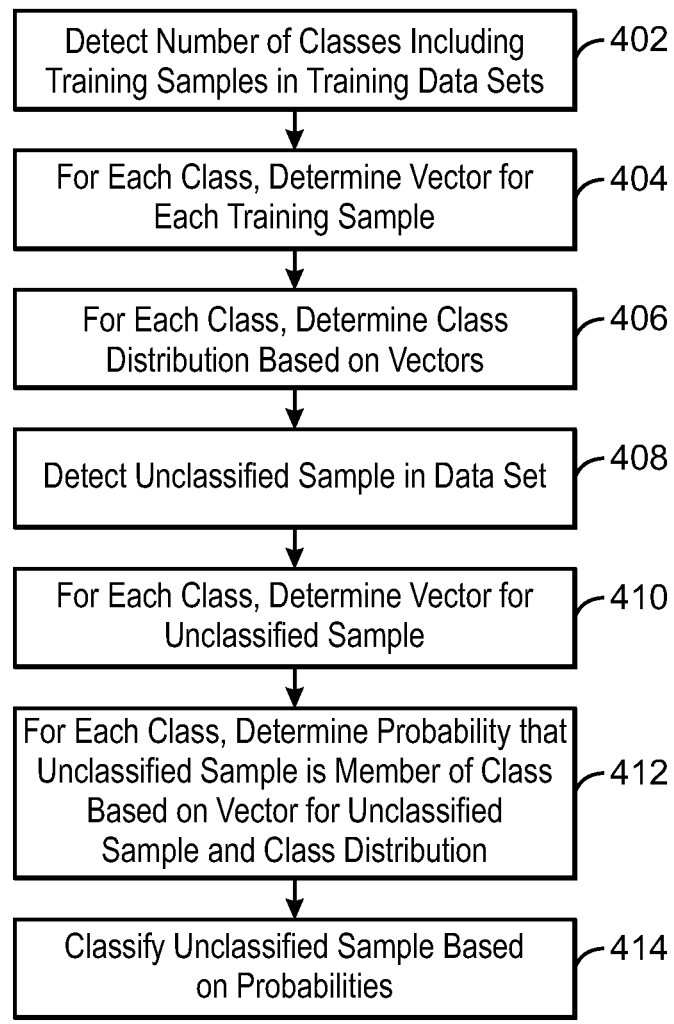
FIG. 4 is a process flow diagram showing a method for classifying unclassified samples.

FIG. 4 is a process flow diagram showing a method 400 for classifying samples. The method 400 may be executed by the computing device 100 described above with respect to FIG. 1, or by any other suitable type of computing system. The method 400 may be used to mitigate class imbalance in a data set by allowing for the accurate determination of a class of one or more unclassified samples in the data set.

The method begins at block 402, at which a number of classes including training samples in training data sets are detected. Each class may include a majority class and one or more minority classes. Any number of new training samples may be dynamically added to a training data set relating to a class at any time. The training samples may include, for example, online streaming data.

At block 404, for each class, a vector for each training sample is determined. The vector for a training sample is determined based on a specified number of nearest neighbor distances between the training sample and the specified number of nearest neighbor training samples within the same class. The nearest neighbor distances may be Euclidean distances, and the nearest neighbor training samples may be training samples that are in closest proximity to the training sample in terms of the Euclidean distance.

The specified number may be set to a value of 1 by default. However, the specified number may be dynamically adjusted. For example, the specified number may be adjusted automatically by the computing device executing the method 400, or may be adjusted in response to input from a user of the computing device.

At block 406, for each class, a class distribution is determined based on the vectors for the training samples. The class distribution may be an empirical cumulative distribution function (CDF) for the class. In addition, the class distribution may be of the specified number of dimensions.

At block 408, an unclassified sample in a data set is detected. The unclassified sample may include, for example, online streaming data.

At block 410, for each class, a vector for the unclassified sample is determined. The vector for the unclassified sample is determined for a class based on the specified number of nearest neighbor distances between the unclassified sample and the specified number of nearest neighbor training samples within the class. The nearest neighbor distances may be Euclidean distances, and the nearest neighbor training samples may be training samples that are in closest proximity to the unclassified sample in terms of the Euclidean distance.

At block 412, for each class, a probability that the unclassified sample is a member of the class is determined. The probability is determined for a class based on the vector for the unclassified sample and the class distribution of the class. According to examples described herein, a higher probability corresponds to a higher likelihood that the nearest neighbor distances for a particular class are greater than the nearest neighbor distances for the unclassified sample with respect to the class. Thus, sparse classes with larger nearest neighbor distances, e.g., minority classes, may be given appropriate consideration during the classification procedure.

At block 414, the unclassified sample is classified based on the probabilities for the classes. Classifying the unclassified sample may include determining a class of the unclassified sample based on a probability that the unclassified sample is a member of each class. For example, the unclassified sample may be assigned to the class with the highest associated probability.

It is to be understood that the process flow diagram of FIG. 4 is not intended to indicate that the steps of the method 400 are to be executed in any particular order, or that all of the steps of the method 400 are to be included in every case. Further, any number of additional steps not shown in FIG. 4 may be included within the method 400, depending on the details of the specific implementation.

The method 400 may be used to classify unclassified samples for a variety of applications. Because the method 400 does not rely on tuning parameters, it is particularly well-suited for use with online streaming data. For example, the method 400 may be used to analyze oil flow rates from sensors placed in a well bore to determine whether particular data points relate to normal operation or a hazardous condition, such as slugging. Thus, normal operation may be represented by one class, while hazardous conditions may be represented by one or more other classes. Further, according to the method 400, if the class imbalance changes as a result of the arrival of a new training sample, a vector for the new training sample may be factored into the associated class distribution.

Figure 5:
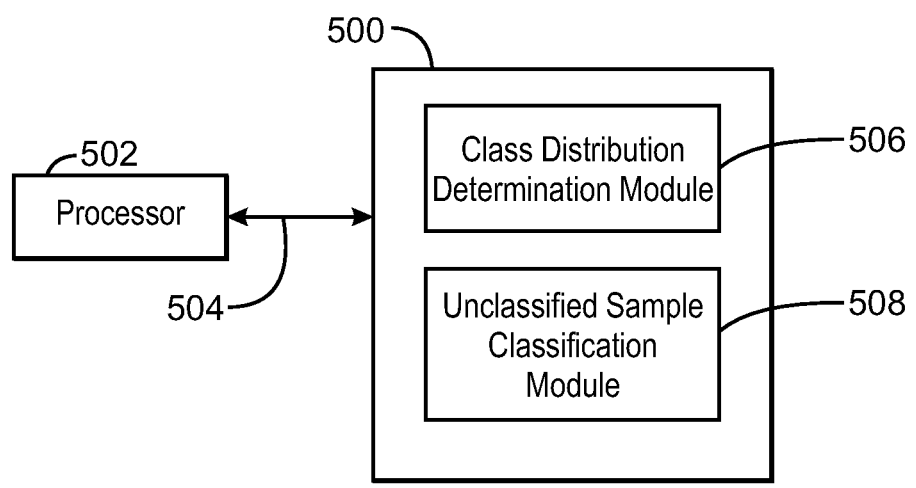
FIG. 5 is a block diagram showing a tangible, non-transitory, computer-readable medium that stores a protocol adapted to classify unclassified samples.

FIG. 5 is a block diagram showing a tangible, non-transitory, computer-readable medium 500 that stores a protocol adapted to classify unclassified samples. The tangible, non-transitory, computer-readable medium 500 may be accessed by a processor 502 over a computer bus 504. Furthermore, the tangible, non-transitory, computer-readable medium 500 may include code to direct the processor 502 to perform the steps of the current method.

The various software components discussed herein may be stored on the tangible, non-transitory, computer-readable medium 500, as indicated in FIG. 5. For example, a class distribution determination module 506 may be adapted to determine distributions for a number of classes using training samples in training data sets. In addition, an unclassified sample classification module 508 may be adapted to determine a class of one or more unclassified samples in a data set based on the class distributions determined by the class distribution determination module 500.

It is to be understood that FIG. 5 is not intended to indicate that all of the software components discussed above are to be included within the tangible, non-transitory, computer-readable medium 500 in every case. Further, any number of additional software components not shown in FIG. 5 may be included within the tangible, non-transitory, computer-readable medium 500, depending on the details of the specific implementation.

The present examples may be susceptible to various modifications and alternative forms and have been shown only for illustrative purposes. For example, the present techniques support both reading and writing operations to a data structure cache. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for classifying unclassified samples, comprising:
   detecting a plurality of classes, wherein each class comprises training samples within a training data set, and wherein each of the training samples is associated with a class;
   for each class, determining a vector for each training sample based on a specified number of nearest neighbor distances between the training sample and the specified number of nearest neighbor training samples;
   for each class, determining a class distribution based on the vectors for the training samples;
   detecting an unclassified sample in a data set;
   for each class, determining a vector for the unclassified sample based on the specified number of nearest neighbor distances between the unclassified sample and the specified number of nearest neighbor training samples within the class;
   for each class, determining a probability that the unclassified sample is a member of the class based on the vector for the unclassified sample and the class distribution of the class; and
   classifying the unclassified sample based on the probabilities.

2. The method of claim 1, wherein classifying the unclassified sample comprises determining a class of the unclassified sample based on a probability that the unclassified sample is a member of each class.

3. The method of claim 1, wherein the training data set and the data set comprise online streaming data.

4. The method of claim 1, wherein determining a vector for a training sample comprises identifying a Euclidean distance between the training sample and the specified number of nearest neighbor training samples, and wherein the nearest neighbor training samples comprise training samples that are in a closest proximity to the training sample in terms of the Euclidean distance.

5. The method of claim 1, wherein determining a class distribution for a class comprises determining an empirical cumulative distribution function (CDF) based on the vectors for the training samples within the class.

6. The method of claim 1, wherein determining a vector for the unclassified sample comprises identifying a Euclidean distance between the unclassified sample and the specified number of nearest neighbor training samples within the class, and wherein the nearest neighbor training samples comprise training samples that are in a closest proximity to the unclassified sample in terms of the Euclidean distance.

7. The method of claim 1, comprising dynamically adjusting the specified number.

8. A system for classifying unclassified samples, comprising:
   a processor that is adapted to execute stored instructions; and
   a storage device that stores instructions, the storage device comprising processor executable code that, when executed by the processor, is adapted to:
      detect a plurality of classes, each class comprising a plurality of training samples within a training data set, and wherein each of the training samples is associated with a class;
      for each class, determine a vector for each training sample based on a specified number of distances between the training sample and the specified number of closest training samples;
      for each class, determine a class distribution based on the vectors for the training samples;
      detect an unclassified sample in a data set;
      for each class, determine a vector for the unclassified sample based on the specified number of distances between the unclassified sample and the specified number of closest training samples;
      for each class, determine a probability that the unclassified sample is a member of the class based on the vector for the unclassified sample and the class distribution; and
      determine a class of the unclassified sample based on the probabilities.

9. The system of claim 8, wherein the training data set and the testing data set comprise online streaming data.

10. The system of claim 8, wherein the plurality of classes comprises a majority class and one or more minority classes.

11. The system of claim 8, wherein the class distribution for a class comprises an empirical cumulative distribution function.

12. The system of claim 8, wherein the distances comprise Euclidean distances.

13. The system of claim 8, wherein the closest training samples comprise training samples that are in a closest proximity to another training sample or the unclassified sample in terms of a Euclidean distance.

14. The system of claim 8, wherein the unclassified sample comprises an unclassified testing sample in a testing data set.

15. A tangible, non-transitory, computer-readable medium comprising code configured to direct a processor to:
- detect a plurality classes, wherein each class comprises training samples within a training data set, and wherein each of the training samples is associated with a class;
- for each class, determine a class distribution based on vectors for the training samples, wherein the vectors are generated based on a specified number of nearest neighbor distances between each training sample and the specified number of nearest neighbor training samples;
- detect an unclassified sample in a data set;
- for each class, determine a vector for the unclassified sample based on the specified number of nearest neighbor distances between the unclassified sample and the specified number of nearest neighbor training samples within the class;
- for each class, determine a probability that the unclassified sample is a member of the class based on the vector for the unclassified sample and the class distribution; and
- classify the unclassified sample based on the probabilities.

16. The tangible, non-transitory, computer-readable medium of claim 15, wherein the code is configured to direct a processor to determining a vector for a training sample by identifying a Euclidean distance between the training sample and the specified number of nearest neighbor training samples, and wherein the nearest neighbor training samples comprise training samples that are in a closest proximity to the training sample in terms of the Euclidean distance.

17. The tangible, non-transitory, computer-readable medium of claim 15, wherein the class distribution comprises an empirical cumulative distribution function (CDF).

18. The tangible, non-transitory, computer-readable medium of claim 15, wherein the code is configured to direct a processor to determine a vector for the unclassified sample by identifying a Euclidean distance between the unclassified sample and the specified number of nearest neighbor training samples within a class, and wherein the nearest neighbor training samples comprise training samples within the class that are in a closest proximity to the unclassified sample in terms of the Euclidean distance.

19. The tangible, non-transitory, computer-readable medium of claim 15, wherein the unclassified sample comprises an unclassified testing sample in a testing data set.

20. The tangible, non-transitory, computer-readable medium of claim 15, wherein the code is configured to direct a processor to assign the unclassified sample to a class with a highest associated probability.

\* \* \* \* \*